United States Patent Office 3,339,410
Patented Sept. 5, 1967

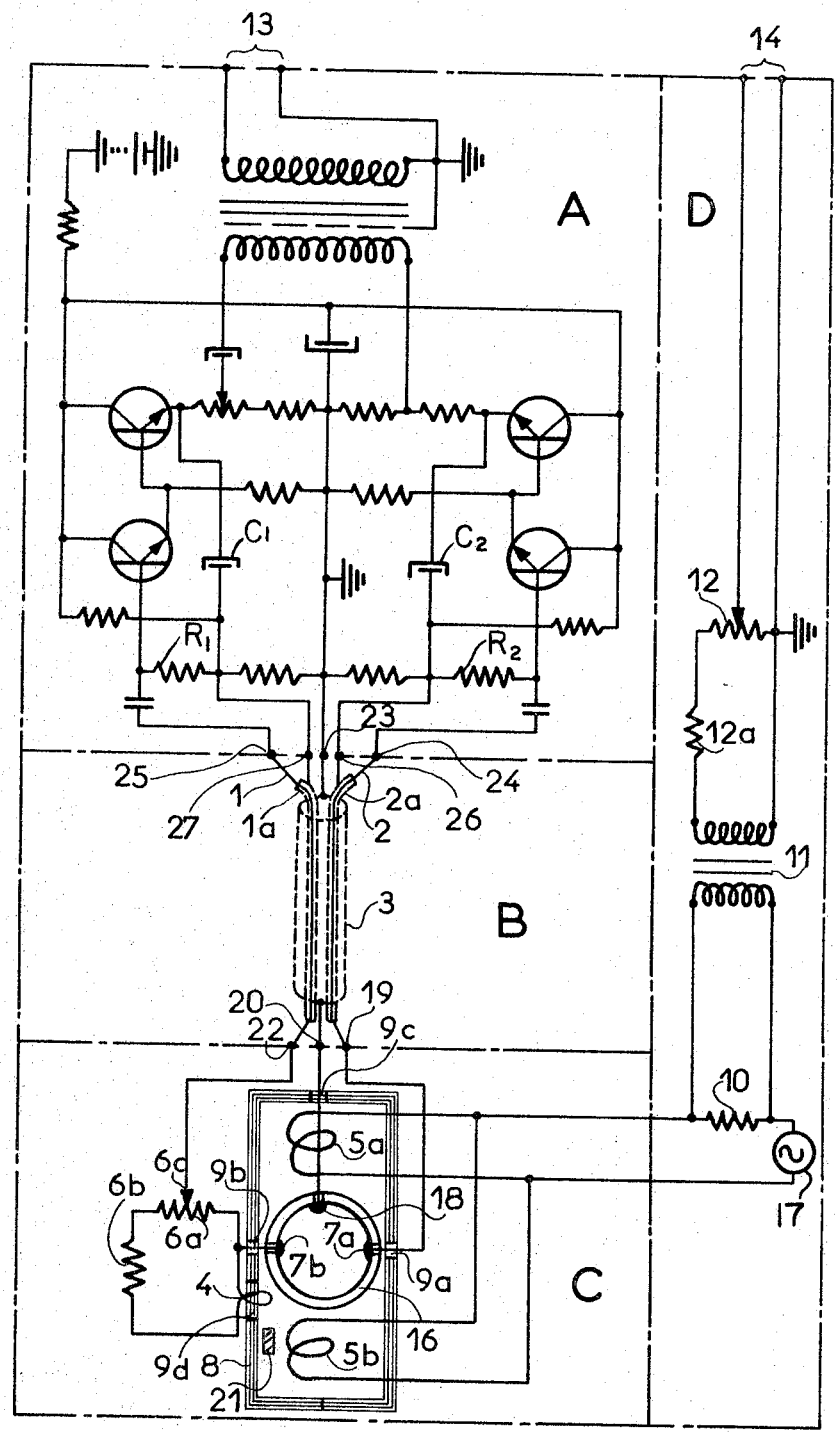

3,339,410
FLOW METER
Marius Steru, Paris, France, assignor to Compagnie Generale d'Electronique Industrielle Lepaute, Paris, France
Filed Feb. 4, 1965, Ser. No. 430,258
Claims priority, application France, Feb. 6, 1964, 962,862
12 Claims. (Cl. 73—194)

ABSTRACT OF THE DISCLOSURE

An electromagnetic flow meter generally comprising a flow-carrying conduit within which are placed two electrodes mutually facing one another and subjected to an electromagnetic field provided perpendicularly to the direction of flow of fluid and to the line interconnecting the electrodes, a differential amplifier connected to the contacts of the measuring circuit and having a high negative feedback circuit to which the shielding portions of a co-axial cable interconnecting the measuring circuit with the differential amplifier are connected, thereby effectively placing the capacitance of the connecting means across the input of the differential amplifier to maintain the high input impedance thereof. In addiiton, a pick up coil is connected between one contact of the measuring circuit and the input to the differential amplifier is associated with an adjustable core member within the magnetic field of the measuring circuit for purposes of compensating for unwanted voltages induced in the circuitry due to the magnetic field, the core member providing a distortion in the voltage induced into the coil corresponding to the distortion created by the magnetic field in the magnetic circuitry of the measuring circuit.

---

The present invention relates to an electromagnetic flow meter with electronic circuits, comprising transistors or other semi-conductor components.

The term "electromagnetic flow meters" includes flow meters based on the known principle of measuring the flow of an electrically conductive liquid by the electromotive force induced in the liquid moving in a magnetic field, said field being perpendicular to both the direction of the liquid motion and the direction of the measurement of the electromotive force.

In order to avoid the disturbance due to the electro-chemical polarization electromotive force, the induced electromotive force has to be of the alternating type, hence it has to be induced by an alternating induction field.

The system comprising the equipment generating the magnetic field, the electrodes collecting the induced electromotive force, and possibly other auxiliary components, and which is traversed by the moving liquid, will be referred to hereafter as the "pick-up."

The circuitry transforming the signal produced by the pick-up will be referred to hereafter as the "receiver" or "measuring circuit."

The object of the present invention is to provide flow meters with improved operating parameters, which are easy to construct.

In particular, an object of the invention is to provide a flow meter having a higher reliability than that of systems comprising components the operation of which is based on a mechanical motion such as: electromechanical potentiometers or compensators, electromagnetic balances, etc.

An electromagnetic flow meter generally comprising a flow-carrying conduit within which are placed two electrodes, mutually facing one another along a line perpendicular to the direction of flow in the conduit, an electromagnetic field being provided perpendicularly to the direction of the flow and to the line of the electrodes. The electromotive force induced in the flow of a liquid by the magnetic field provides a signal which is referred to hereafter as a "flow-signal," collected by the electrodes. The measurement of the flow signal, which provides the measurement of the flow, must be done with a measuring circuit having a very high input impedance, in order not to create a voltage drop in the liquid and thus obtain a faulty reading. If a voltage drop occurs in the liquid, the voltage collected between the electrodes will be the electromotive force minus the voltage drop in the liquid. As this drop varies with the resistance of the liquid, the value measured depends upon the resistivity of the liquid, therefore upon its nature, its composition and its temperature.

It is another object of the present invention to provide a flow meter producing a measurement of the flow of a liquid independent of the physical conditions of the liquid; that is, independent of its temperature, its nature, or its chemical composition.

A further object of the invention is to provide a flow meter which enables correct measurement of the flow of a liquid no matter how long the cable which connects the pick-up assembly with the measuring circuit.

In a flow meter according to the present invention, the input side of the measuring circuit comprises a differential amplifier with high negative feedback, which may include beneficially transistors or other semi-conductor components, operating as a high input impedance matching transformer having a feedback loop operatively connected to a cable connecting the pick-up assembly to the measuring circuit and operable to be sensitive to the capacitive loading of the cable, so that the disturbing effect of the capacitance can be compensated.

The flow meter according to the present invention further comprises means for cancelling the unwanted voltages induced in the circuitry by the alternating field.

These and further objects, features, and advantages of the present invention will become more obvious from the following description when taken in connection with the accompanying drawing, which shows, for purposes of illustration only, one embodiment in accordance with the present invention and wherein the single figure is a schematic diagram of the circuitry of an electromagnetic flow meter according to the present invention.

The flow meter of the invention comprises, in its broadest terms, a pick-up assembly C, a cable B, an amplifying circuit A, and a calibration circuit D.

The pick-up assembly C comprises a conduit 16 through which flows a liquid, the flow of which is to be measured. Coil means, such as coils 5a and 5b supplied with alternating current by a conventional source of alternating current 17, are arranged to produce a magnetic field traversing the conduit 16 in a direction perpendicular to the direction of the flow of the liquid. Two electrodes 7a and 7b are disposed at opposite inner sides of the conduit 16 along a line which is perpendicular to both the magnetic field and the direction of the flow (the direction of the flow being perpendicular to the plane of the drawing).

A further electrode 18 is arranged in the conduit to provide a reference potential connected to the ground.

The assembly formed by the coils 5a, 5b, the conduit 16, and the electrodes 7a, 7b, and 18 is enclosed in a magnetic screen or shield 8 having apertures 9a, 9b, and 9c through which extend the conductors connecting the electrodes 7a, 7b, and 18, respectively, to the rest of the circuit. These apertures 9a, 9b, and 9c are arranged in front of the extension of each electrode so as to reduce the length of the conductors connected to the electrodes, thus reducing a possible unwanted magnetic influence on these conductors. Electrodes 7a and 18 are connected with the terminals 19 and 20 while electrode 7b is connected to a circuit comprising in series a potentiometer 6a, an adjustable impedance 6b and a winding or coil 4. Coil 4 is situated inside the magnetic screen 8 and is connected to the aforementioned series circuit by way of conductors extending through aperture 9D. This arrangement further comprises a magnetic core 21 of any suitable construction, which is adjustable in its position in the axial and/or transverse direction of the coil 4. The core 21 may be made of laminated magnetic strips operable to modify the magnetic field flowing through the coil 4 so as to introduce distortions in the electromotive force induced therein. The adjustable impedance 6b may be a resistor or an element for controlling the current flowing through the winding 4. This impedance may be controlled by means (not shown in the figure) responsive to the phase of the magnetic field.

The potentiometer 6a includes an adjustable tap 6c connected to a terminal 22.

The amplifying circuit comprises a cascaded semi-conductor differential amplifier A having three main input terminals: terminal 23 is connected to the ground while terminals 24 and 25 constitute the inputs of the amplifier. Amplifier A includes a first and a second negative feedback circuit consisting of capacitors $C_1$ and $C_2$ and resistors $R_1$ and $R_2$, respectively, connected to terminals 26 and 27. The pair of terminals 13 forms the output of the amplifier. Being of conventional type, the amplifier A is not described in detail in the present specification.

The cable B comprises two coaxial cables including inner conductors 1 and 2 enclosed in electrostatic shields 1a and 2a and placed together within a common shield 3 connected with terminals 20 and 23. The ends of conductor 1 are connected, respectively, to terminals 22 and 25 while the ends of conductor 2 are connected, respectively, with the terminals 19 and 24. Shields 1a and 2a are connected only with terminals 27 and 26, respectively.

The flow meter of the invention further comprises a calibration circuit D comprising a resistor 10 inserted in the feed circuit of the coils 5a and 5b. The primary winding of a transformer 11 is connected across the terminals of the resistor 10 while the secondary winding is included in a circuit comprising an impedance 12a and a voltage divider 12, the adjustable tap of which is connected to one of the terminals 14, the second of these terminals 14 being connected to the ground.

The two pairs of terminals 13 and 14 are connected to a conventional measuring device (not shown) operable to compare the voltage at the terminals 13 with the voltage at the terminals 14.

*Operation*

The flow meter according to the present invention works as follows: The alternating magnetic field produced by coils 5a and 5b induces in the fluid flowing in the conduit 16 an electromotive force collected by electrodes 7a and 7b. The electromotive force or "flow signal" is transmitted by the cable assembly B to the differential amplifier A and, after amplification, is measured by the measuring device (not shown) connected with the terminals 13. The calibration circuit D provides at the output terminals 14 a voltage in phase with the flow signal and proportional to the magnitude of the magnetic field in the pick-up assembly. Thus, in the case of any variation in the value of the magnetic field, the voltage at 14 varies proportionately to the value of the magnetic field. The ratio of the signal at 13 to the signal at 14 will enable a correct measurement of the value of the flow of the fluid, this measurement being no more disturbed by any accidental variation of the value of the magnetic field.

The flow signal collected at the electrodes 7a, 7b may have a very low magnitude, and it is very important that the input of the amplifier presents a very high impedance.

The capacitance of the cable connecting the electrodes collecting the signal, located in the pick-up assembly, to the amplifier located in the receiver part, constitutes a capacitive shunt in parallel with the measuring circuit input across terminals 25, 27, and 24, 26 and decreases the input impedance of this circuit.

According to this invention, the effect of the capacitance of this cable is compensated by introducing it into the feedback loop of the input stages of the electronic measuring circuit. Thus is obtained a high input impedance for the measuring circuit. In this manner the system becomes substantially unaffected by the length of the connecting cable and by its possible capacitance variations.

In addition to the flow signal there appears between the electrodes 7a, 7b a noise voltage in phase quadrature with the signal, this voltage being induced in the turn made up by the electrode connections and the liquid, since this turn is located in the magnetic field.

According to this invention, this noise voltage is fully or partially compensated by opposing to it a compensating voltage of similar shape, induced in the coil 4 located in the magnetic field created by the coils 5a and 5b; the value of the compensating voltage may be adjusted by the impedance 6b or by the adjustable potentiometer 6a.

The noise voltage is somewhat distorted with reference to the magnetic field; according to the invention, in order to achieve a satisfactory compensation, the compensating voltage is distorted in the same manner. This result is obtained by introducing in the induction field traversing the coil 4, relatively thin, mild laminated steel strips forming the core 21, the position of which may be adjusted in the axial direction of coil 4 and which produce a small non-linear distortion of the induced compensating voltage. It will be noted that the core 21 may be made of any magnetic material able to produce distortions in the alternating magnetic field traversing the coil 4.

In order to reduce to a minimum the above-mentioned noise voltage, the connection of the electrodes 7 and 7a pass across the magnetic circuit made up by mild steel laminations 8, surrounding the whole of the inductance coils 5, through two holes 9a and 9b, provided in said circuit at the level of the extension of the axis of the electrodes 7 and 7a.

As far as the calibration of the apparatus is concerned, according to the present invention, a reference voltage, proportional to the induction field, and in phase with the signal, is created by the voltage drop between the terminals of the resistance 10 through which flows the supply current of the field coils 5.

After passing through the separation transformer 11 and the variable resistance 12, which is used for adjusting its value, this reference voltage may replace the signal during the calibration. By means of this arrangement, it happens that if the current going through the coils varies, the signal and the calibration voltage vary in the same proportion.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. A flow meter for measuring the flow of an electricity conductive liquid flowing through a conduit, comprising means for producing an alternating magnetic field substantially perpendicular to the direction of flow of liqiud through said conduit, electrode means operable to collect the transverse electromotive force induced in said liquid by said alternating magnetic field, measuring circuit means having input terminals respectively operable to give a measure of the flow of said liquid, coil means positioned in said magnetic field, core means of magnetic material disposed in the vicinity of said coil means and operable to modify the magnetic field in the vicinity of said coil means, and connecting means connecting one of said electrode means directly and the other of said electrode means via said coil means to said measuring circuit means and operable to inject in said measuring circuit means the alternating voltage induced in said coil means by said alternating magnetic field.

2. An electromagnetic flow meter for measuring the flow of an electrically conductive liquid flowing through a conduit, comprising:

pick-up means associated with said conduit and including electrodes disposed along a line substantially perpendicular to the direction of the flow of said liquid, connecting circuit means operatively connected with said electrodes and having a pair of output terminals, windings supplied with alternating current for producing an alternating magnetic field substantially perpendicularly to the direction of said flow and to said line, said magnetic field thus inducing in the liquid an electromotive force collected by said electrodes, amplifying means having output terminals and input terminals, connecting means operatively connecting the output terminals of said pick-up means with the input terminals of said amplifying means, said pick-up means further including adjustable means for producing an alternating voltage in phase quadrature with said electromotive force, said adjustable means being provided with coil means disposed in said magnetic field and operatively connected with said connecting circuit means of said electrodes, so as to inject the alternating voltage picked up by said coil means into said connecting circuit means, and core means including strips of magnetic material, placed in the vicinity of said coil means, and operable to modify the magnetic field in the vicinity of said coil means.

3. An electromagnetic flow meter for measuring the flow of an electrically conductive liquid flowing through a conduit, comprising:

pick-up means associated with said conduit and including electrodes disposed along a line substantially perpendicular to the direction of the flow of said liquid, connecting circuit means operatively connected with said electrodes and having a pair of output terminals, windings supplied with alternating current for producing an alternating magnetic field substantially perpendicularly to the direction of said flow and to said line, said magnetic field thus inducing in the liquid an electromotive force collected by said electrodes, amplifying means having output terminals, a first plurality of input terminals, and a second plurality of input terminals, connecting means including a plurality of main conductors and a plurality of electrostatic shield means presenting a capacitance representative of the capacitive loading of said connecting means, said main conductors being connected, respectively, at one end with the output terminals of said pick-up means and at the other end with the first plurality of input terminals of said amplifying means, said amplifying means including a semi-conductor amplifier having negative feedback circuit means connected to a plurality of terminals forming said second plurality of input terminals of said amplifying means, said second plurality of input terminals being further operatively connected with said plurality of shield means, said pick-up means further including adjustable means for producing an alternating voltage in phase quadrature with said electromotive force, said adjustable means being provided with coil means disposed in said magnetic field and operatively connected with said connecting circuit means of said electrodes, so as to inject the alternating voltage picked up by said coil means into said connecting circuit means, and core means including strips of magnetic material placed in the vicinity of said coil means and operable to modify the magnetic field in the vicinity of said coil means.

4. An electromagnetic flow meter according to claim 2, wherein said pick-up means comprises magnetic shielding housing means enclosing said liquid conduit, said electrodes, said windings and said coil means, said housing means being provided with apertures through which extend the conductors connecting the electrodes, the windings, and the coil means with the remainder of the elements of the pick-up means, said apertures being so placed and arranged that said conductors have a minimum length.

5. A device for measuring the flow of an electrically conductive liquid flowing within a conduit, comprising:

two electrode means within said conduit, magnetic circuit means including windings fed from an alternating-current source to create within said conduit a magnetic field substantially perpendicular to the line of said two electrode means and to thereby induce between said electrode means a signal voltage proportional to the flow velocity of said liquid, and amplifier means including input means and output means, first connecting means for connecting the input means of said amplifier with said electrode means including at least two conductor means and shielding means electrically connected to the liquid flowing within said conduit, said amplifier means including two symmetrical amplifier parts each having a separate, relatively high impedance input and connected to one of the conductor means of said first connecting means and the shielding means thereof, and a common, low impedance output, and each of said amplifier parts including feed back circuit means operatively connected between the respective conductor means and the shielding means thereof.

6. A device for measuring the flow of an electrically conductive liquid flowing within a conduit, comprising:

two electrode means within said conduit, magnetic circuit means including windings fed from an alternating-current source to create within said conduit a magnetic field substantially perpendicular to the line of said two electrode means and to thereby induce between said electrode means a signal voltage proportional to the flow velocity of said liquid, and amplifier means including input means and output means, first connecting means for connecting the input means of said amplifier with said electrode means including at least two conductor means and shielding means electrically connected to the liquid flowing within said conduit, said amplifier means including two symmetrical amplifier parts each having a separate, relatively high impedance input and connected to one of the conductor means of said first connecting means and the shielding means thereof, and a common, low impedance output, and each of said amplifier parts including feed back circuit means operatively connected between the respective conductor means and the shielding means thereof, the two conductor means of said connecting means being each provided with individual shielding means disposed within a common shielding means, the feed back circuit means of each amplifier part being connected, on the one hand, to one of said individual shielding means and, on the other, to said common shielding means.

7. A device for measuring the flow of an electrically conductive liquid flowing within a conduit, comprising:
two electrode means within said conduit,
magnetic circuit means including windings fed from an alternating-current source to create within said conduit a magnetic field substantially perpendicular to the line of said two electrode means and to thereby induce between said electrode means a signal voltage proportional to the flow velocity of said liquid,
and amplifier means including input means and output means,
first connecting means for connecting the input means of said amplifier with said electrode means including at least two conductor means and shielding means electrically connected to the liquid flowing within said conduit,
said amplifier means including two symmetrical amplifier parts each having a separate, relatively high impedance input and connected to one of the conductor means of said first connecting means and the shielding means thereof, and a common, low impedance output, and each of said amplifier parts including feed back circuit means operatively connected between the respective conductor means and the shielding means thereof,
and means for compensating for the parasitic voltage, which occurs between said electrode means by the action of the magnetic field on the circuit constituted by the liquid within said conduit and by the connections between said electrode means and the input connections, including further circuit means having auxiliary winding means disposed within the area of action of said magnetic circuit means, one of said electrode means being connected with the respective input means by way of said further circuit means.

8. A device for measuring the flow of an electrically conductive liquid flowing within a conduit, comprising:
two electrode means within said conduit,
magnetic circuit means including windings fed from an alternating-current source to create within said conduit a magnetic field substantially perpendicular to the line of said two electrode means and to thereby induce between said electrode means a signal voltage proportional to the flow velocity of said liquid,
and amplifier means including input means and output means,
first connecting means for connecting the input means of said amplifier with said electrode means including at least two conductor means and shielding means electrically connected to the liquid flowing within said conduit,
said amplifier means including two symmetrical amplifier parts each having a separate, relatively high impedance input and connected to one of the conductor means of said first connecting means and the shielding means thereof, and a common, low impedance output, and each of said amplifier parts including feed back circuit means operatively connected between the respective conductor means and the shielding means thereof,
and means for compensating for the parasitic voltage, which occurs between said electrode means by the action of the magnetic field on the circuit constituted by the liquid within said conduit and by the connections between said electrode means and the input connections, including further circuit means having auxiliary winding means disposed within the area of action of said magnetic circuit means, one of said electrode means being connected with the respective input means by way of said further circuit means,
and means including at least one piece of magnetic metal operatively associated with the magnetic field traversing said auxiliary winding means for creating a distortion in said magnetic field coupled to said auxiliary winding means inducing a voltage therein constituting a compensating voltage in the same sense as the distortion of the parasitic voltage with respect to said magnetic field.

9. A device for measuring the flow of an electrically conductive liquid flowing within a conduit, comprising:
two electrode means within said conduit,
magnetic circuit means including windings fed from an alternating-current source to create within said conduit a magnetic field substantially perpendicular to the line of said two electrode means and to thereby induce between said electrode means a signal voltage proportional to the flow velocity of said liquid,
and amplifier means including input means and output means,
first connecting means for connecting the input means of said amplifier with said electrode means including at least two conductor means and shielding means electrically connected to the liquid flowing within said conduit,
said amplifier means including two symmetrical amplifier parts each having a separate, relatively high impedance input and connected to one of the conductor means of said first connecting means and the shielding means thereof, and a common, low impedance output, and each of said amplifier parts including feed back circuit means operatively connected between the respective conductor means and the shielding means thereof,
said magnetic circuit means surrounding said conduit, and the connections from said electrode means traversing said magnetic circuit means through apertures provided in the latter at the places of said electrode means.

10. A device for measuring the flow of an electrically conductive liquid flowing within a conduit, comprising:
two electrode means within said conduit,
magnetic circuit means including windings fed from an alternating-current source to create within said conduit a magnetic field substantially perpendicular to the line of said two electrode means and to thereby induce between said electrode means a signal voltage proportional to the flow velocity of said liquid,
and amplifier means including input means and output means,
first connecting means for connecting the input means of said amplifier with said electrode means including at least two conductor means and shielding means electrically connected to the liquid flowing within said conduit,
said amplifier means including two symmetrical amplifier parts each having a separate, relatively high impedance input and connected to one of the conductor means of said first connecting means and the shielding means thereof, and a common, low impedance output, and each of said amplifier parts including feed back circuit means operatively connected between the respective conductor means and the shielding means thereof,
and resistance means inserted between the alternating voltage source and the winding means of the magnetic circuit means, the voltage appearing at the terminals of said last-mentioned resistance means constituting a reference voltage.

11. A device for measuring the flow of an electrically conductive liquid flowing within a conduit, comprising:
two electrode means within said conduit disposed at the extremities of a straight line passing substantially through the center of a transverse cross section of said conduit,
magnetic circuit means including windings fed from an alternating-current source to create within said conduit a magnetic field directed substantially perpendicular to the line of said two electrode means and to thereby induce between said electrode means a signal voltage proportional to the flow velocity of said liquid, and amplifier means including input means and output means, first connecting means for connecting the input means of said amplifier with said electrode means including at least two conductor means provided with individual shielding means and common shielding means surrounding said two conductor means and said individual shielding means and being electrically connected to the liquid flowing within said conduit, said amplifier means including two symmetrical amplifier parts connected to a common low impedance output and each having a separate, relatively high impedance input connected to a respective one of the conductor means of said first connecting means, and each of said amplifier parts including feed back circuit means operatively connected between the output and input thereof and to the individual shielding means of the conductor associated therewith, the feed back circuit means of each amplifier part being connected, on the one hand, to one of said individual shielding means and, on the other hand, to said common shielding means through a resistance, and means for compensating for the parasitic voltage, which occurs between said electrode means by the action of the magnetic field on the circuit constituted by the liquid within said conduit and by the connections between said electrode means and the input connections, including further circuit means having adjustable resistance means and auxiliary winding means disposed within the area of action of said magnetic circuit means, one of said electrode means being connected with the respective input means by way of said further circuit means, and at least one piece of magnetic metal operatively associated with the magnetic field traversing said auxiliary winding means for creating a distortion in said magnetic field coupled to said auxiliary winding means inducing a voltage therein constituting a compensating voltage in the same sense as the distortion of the parasitic voltage with respect to said magnetic field.

12. A device for measuring the flow of an electrically conductive liquid flowing within a conduit, comprising:

two electrode means within said conduit disposed at the extremities of a straight line passing substantially through the center of a transverse cross section of said conduit, magnetic circuit means including windings fed from an alternating-current source to create within said conduit a magnetic field directed substantially perpendicular to the line of said two electrode means and to thereby induce between said electrode means a signal voltage proportional to the flow velocity of said liquid, and amplifier means including input means and output means, first connecting means for connecting the input means of said amplifier with said electrode means including at least two conductor means provided with individual shielding means and common shielding means surrounding said two conductor means and said individual shielding means and being electrically connected to the liquid flowing within said conduit, said amplifier means including two symmetrical amplifier parts connected to a common low impedance output and each having a separate, relatively high impedance input connected to a respective one of the conductor means of said first connecting means, and each of said amplifier parts including a feed back circuit means operatively connected between the output and input thereof and to the individual shielding means thereof of the conductor associated therewith, the feed back circuit means of each amplifier part being connected, on the one hand, to one of said individual shielding means and, on the other hand, to said common shielding means through a resistance, and means for compensating for the parasitic voltage, which occurs between said electrode means by the action of the magnetic field on the circuit constituted by the liquid within said conduit and by the connections between said electrode means and the input connections, including further circuit means having adjustable resistance means and auxiliary winding means disposed within the area of action of said magnetic circuit means, one of said electrode means being connected with the respective input means by way of said further circuit means, and means including at least one piece of magnetic metal operatively associated with the magnetic field traversing said auxiliary winding means for creating a distortion in said magnetic field coupled to said auxiliary winding means inducing a voltage therein constituting a compensating voltage in the same sense as the distortion of the parasitic voltage with respect to said magnetic field, said magnetic circuit means surrounding said conduit, and the connections from said electrode means traversing said magnetic circuit means through apertures provided in the latter at the places of said electrode means, and resistance means inserted between the alternating voltage source and the winding means of the magnetic circuit means, the voltage appearing at the terminals of said last-mentioned resistance means constituting a reference voltage.

References Cited

UNITED STATES PATENTS

| 2,696,737 | 12/1954 | Mittelmann | 73—194 |
| 3,078,712 | 2/1963 | Koblenz et al. | 73—194 |
| 3,263,500 | 8/1966 | Krishnawany et al. | 73—194 |

FOREIGN PATENTS

| 816,107 | 7/1959 | Great Britain. |
| 834,011 | 5/1960 | Great Britain. |

JAMES J. GILL, *Acting Primary Examiner.*

RICHARD C. QUEISSER, *Examiner.*

C. A. RUEHL, *Assistant Examiner.*